United States Patent [19]

Hoolehan et al.

[11] Patent Number: 5,608,661

[45] Date of Patent: Mar. 4, 1997

[54] METHOD AND APPARATUS FOR SEMI-AUTOMATIC NUMBER VERIFICATION

[75] Inventors: Phillip J. Hoolehan, 15723 Lake Hills Ct., Orland Park, Ill. 60462; Wayne F. Bulmahn, Lombard, Ill.; Michael B. Jebb, Riverside, Ill.; John A. Stout, Willowbrook, Ill.; Keith R. Rose, Minneapolis, Minn.

[73] Assignee: Phillip J. Hoolehan, Orland Park, Ill.

[21] Appl. No.: 522,652

[22] Filed: Sep. 1, 1995

[51] Int. Cl.$^6$ .................................................. G06F 3/00
[52] U.S. Cl. ......................................... 364/709.06; 364/740
[58] Field of Search ................................... 364/709.06, 740

[56] References Cited

U.S. PATENT DOCUMENTS

| | | | |
|---|---|---|---|
| 2,573,356 | 10/1951 | Rabenda | 235/61.7 |
| 2,700,755 | 1/1955 | Burkhart | 235/306 |
| 2,832,412 | 4/1958 | Bellinger et al. | |
| 3,612,843 | 10/1971 | Aptroot-Soloway | 371/69.1 |
| 3,794,818 | 2/1974 | Kennedy | 371/71 |
| 3,846,626 | 11/1974 | Yoshida | 235/153 |
| 3,898,449 | 8/1975 | Sanabria | 371/21.2 |
| 3,983,380 | 9/1976 | Sharif et al. | 235/156 |
| 4,085,312 | 4/1978 | Kashio | 371/69.1 |
| 4,346,450 | 8/1982 | Matsuyama | 364/710 |
| 4,418,412 | 11/1983 | Kariya | 371/68 |

OTHER PUBLICATIONS

IBI Pustell Sequence Analysis Programs, User's Manual, pp. 3–1 through 3–4, IBI-A Kodak Company, 1988.

Primary Examiner—Paul P. Gordon
Assistant Examiner—Yoncha Kundupoglu
Attorney, Agent, or Firm—Fitch, Even, Tabin & Flannery

[57] ABSTRACT

Semi-Automatic Number Verification (SNV) on an electronic adding machine employing a small amount of random access memory (RAM), a microprocessor, a printer link and printer, a piezo-electric speaker to facilitate conventional adding machine capabilities with the additional SNV feature employing an enable/disable (SNV) button. A keypunch operator depresses the SNV key to start the SNV process entering numbers with either the plus (+) or minus (−) key, entered appropriately into the RAM, and particularly an RAM module including first and second series arrays and first and second counters. When the operator depresses the TOTAL key, the printer is enabled, if it is currently switched on. The operator then enters the second series of numbers and the microprocessor compares the values to those stored in the RAM module. If a discrepancy is detected, the adding machine enters an edit mode in which the operator need only look at the original source document and the display for verification of entries.

20 Claims, 3 Drawing Sheets

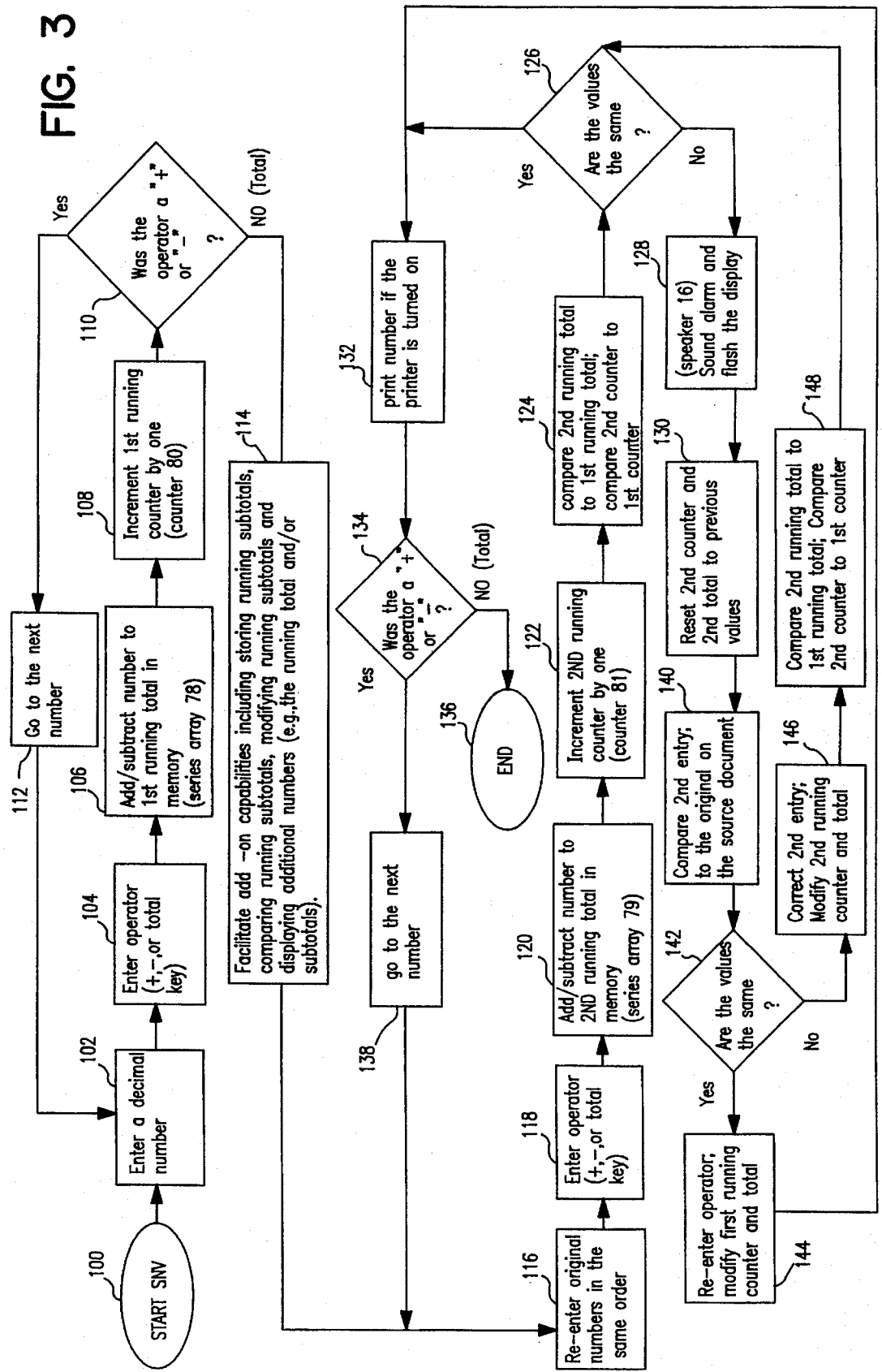

METHOD AND APPARATUS FOR SEMI-AUTOMATIC NUMBER VERIFICATION

BACKGROUND OF THE INVENTION

The invention relates to keypunching with electronic adding machines, and more particularly to an improved method and apparatus improving operator accuracy, speed of operation, entry verification and mispunch identification avoiding the need for the additional printing of extra printed tapes for comparison.

One of the most trivial yet important aspects of keypunching is accuracy during the continual operation of electronic adding machines over extended periods or for long series of numbers. Employers expect accuracy from their employees, yet sometimes accuracy is impeded by personal matters, time constraints or boredom. Many clerical personnel do so much keypunching in fact, that the act becomes a seemingly innate, unconscious act. Keypunching in its most simple form, adding machine operation, may well be the pinnacle of repetitious mundane job duties but almost all financial professionals are forced to spend some time operating adding machines. As one moves down the continuum from professional to clerical status, the reliance upon the adding machine, as an operator thereof, increases as a greater proportion of job duties involve data entry clerical tasks requiring the use of adding machines. A controller, for instance, might spend only ten minutes per day in front of the adding machine, whereas an insurance claims adjuster may spend five or more hours each day operating the adding machine. Assuming that there are far more employees at the clerical level than the controller level, it follows that there are more medium to heavy adding machine users than there are light users.

Anyone who has ever had the misfortune of entering a long series of numbers knows just how poor eye-hand coordination can be, when it is almost impossible to enter a hundred numbers correctly the first time. It seems like an insurmountable task, yet hundreds of thousands of business people each day spend significant amounts of time keypunching. When such people enter a series of a hundred or so numbers, he or she is already convinced that at least one and probably several errors are going to occur. In fact, the keypunch operator does not even give himself or herself the benefit of the doubt, the resulting error is going to be double-checked. It is an industry standard to double-check long series of numbers. Auditors, Claims Adjusters and Clerks from across the world know that totals are meaningless unless they are double-checked. Conventionally, this double-checking process requires the second entry and second printing of the adding machine tape printout for comparison and verification of totals.

Double-checking is not a major problem when the totals agree. What happens, however, when after entering a series of numbers twice, two different totals result? Then, the already frustrated adding machine operator proceeds to align the tapes side-by-side, and tries to visually scan for differences. Maybe the totals are only $10.00 apart, and the operator sees the entry for $40.00 and one for $50.00, and thus identifies the difference. What if, on the other hand, the difference is more typically a less readily identifiable figure, and it is spread over several entries? Obviously, a person's patience is effectively pushed to the limit in this modern-day contest of man versus machine. The clerk is making many decisions at this point. Do I enter the series a third time? Do I write down all the differences I can see and try to come up with the total difference? Should I just throw out both tapes, and start from scratch? Even somebody who has never turned on an adding machine can sympathize with the operator's plight.

There exists a need therefore, for the ready and perhaps immediate identification of keypunch errors as they may occur to alert the operator of the potential for such errors facilitating the verification and correction of such erroneous keypunch entries before they may become manifested and not readily identifiable within a lengthy series of computations. It would be further desirable to avoid the need for the manual and visual comparison of long series of computations when discrepancies do occur.

SUMMARY OF THE INVENTION

It is an object of the invention to facilitate the correct total the second time, every time keypunch operation is required for a lengthy series of numbers where the second entry thereof is required for double-checking the keypunching.

It is an additional object of the invention to achieve the correct total without the need for a printed tape.

It is another object of the invention to provide a desired printed tape, if required, the printed tape being free of additional entries or steps and errors for a series of numbers.

It is a further object of the invention to provide a method and apparatus utilizing a process referred herein as semi-automatic number verification (SNV) wherein a first series array, a second series array, a first counter and a second counter are provided in random access memory (RAM) for the first and second entry and counting facilitating the industry standard double-checking of a long series of numbers utilizing the electronic adding machine to facilitate comparison between the series arrays and counters notifying keypunch operators of apparent entry errors and allowing the verification and correction thereof.

Briefly summarized, the present invention relates to a method and apparatus for semi-automatic number verification (SNV) facilitating the SNV process on an electronic adding machine by employing a small amount or portion of random access memory (RAM), a microprocessor, a printer link and printer, and a piezo-electric speaker to facilitate conventional adding machine capabilities with the additional SNV feature employing an enable/disable (SNV) button. A keypunch operator deciding to utilize the SNV feature depresses the SNV key thus temporarily disabling the printer, if the printer is presently on, to start the SNV process whereupon the operator enters numbers with either the plus (+) or minus (−) key, which numbers are entered appropriately into the RAM, and particularly a RAM module including first and second series arrays and first and second counters. The counter for the first series of numbers is increased by 1 for each entry. When the operator depresses the TOTAL key, the printer is enabled, if it is currently switched on. As the operator now enters the second series of numbers, the microprocessor compares the values to those stored in the RAM module, i.e., the first series array and first counter. If the first number agrees, it is printed, the counter for the second series is increased by 1 and the operator continues through the series. As soon as a discrepancy is detected, the printing halts, a small audible "beep" is made, and the calculator or adding machine enters the edit mode at which point the operator need only look at the original source document and the display for verification and correction of entries, thus correcting any discrepancy upon which the printer is re-activated. If the number entered is correct, the operator need only enter the plus (+) or minus (−) key again which will effectively override the number in the first series, and the checking process continues, until there are two identical entries. This process is functionally the same, whether the first or second series location is incorrect. Either way, the correct number is entered, the correct total accumulation continues and the tape remains error free and free of extra steps. The printed output is optional, many users still however may require or desire to have the printed tape output as an audit trail.

A more detailed description of the preferred embodiment of the invention, and further objects and advantages of the invention are set forth in the drawings, in the detailed description which follows and the claim annexed hereto and forming a part of this specification. SNV is intended to increase accuracy and work volume while at the same time lowering costs and decreasing operator frustration, these and additional advantages, objects and modifications thereof will be readily apparent to those skilled in the art of electronic adding machine and calculator manufacturing, and thus the invention itself is defined in particularity in the claims.

BRIEF DESCRIPTION OF THE DRAWINGS

FIG. 3 shows a flowchart of some of the operations that are performed with the apparatus 10 shown in FIG. 1.

DETAILED DESCRIPTION OF THE PREFERRED EMBODIMENTS

Figure 1:
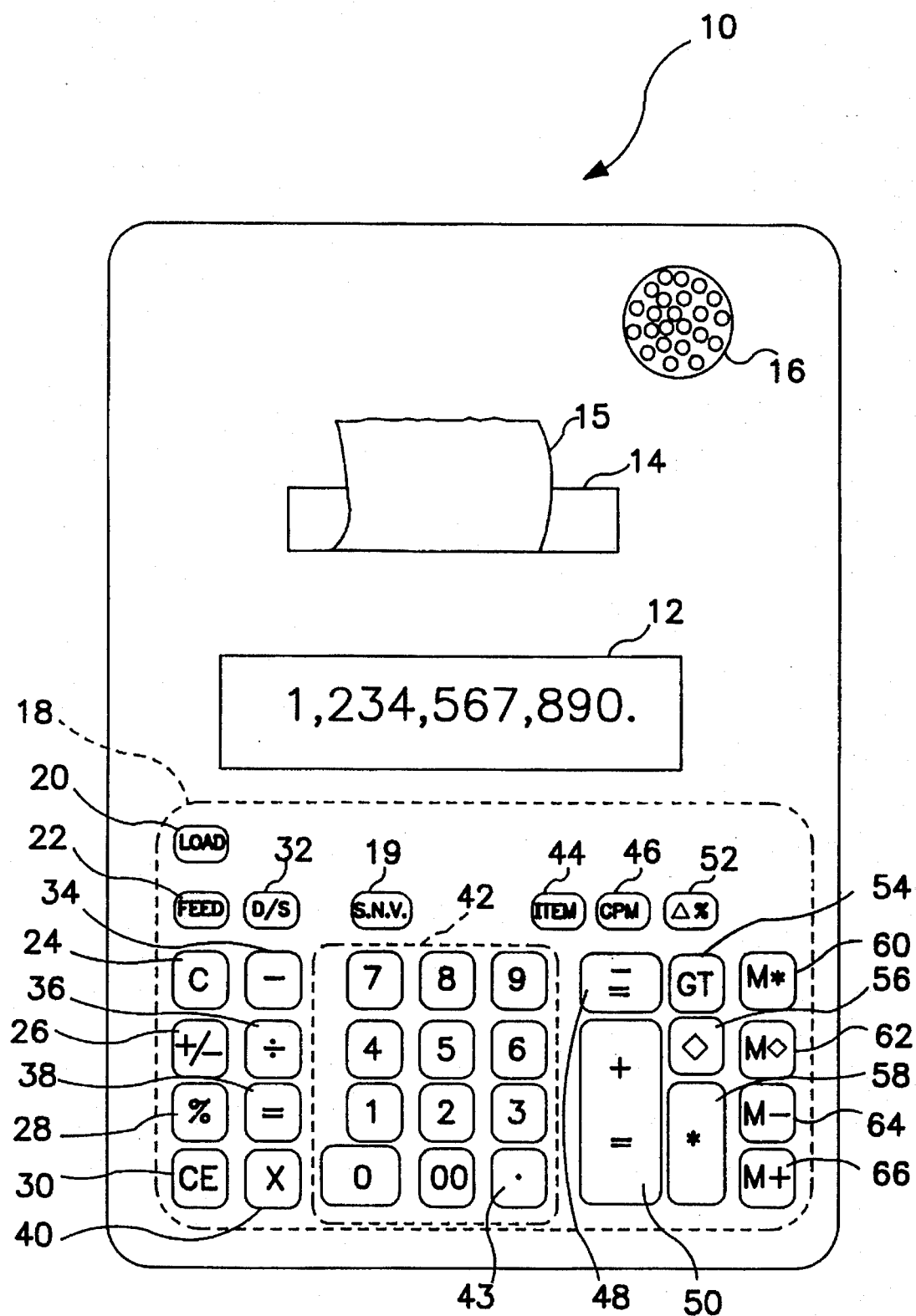
FIG. 1 is a plan view of an apparatus 10, herein an electronic adding machine embodiment in accordance with the teachings of the present invention.

Referring to the drawings, and especially FIG. 1, an apparatus embodying the present invention is generally shown therein and is identified by the numeral 10. The apparatus 10 comprises an electronic display 12 which may be provided as a conventional light emitting diode (LED) or liquid crystal display (LCD) as may be found on conventional adding machines. The apparatus 10 also includes a printer 14 for providing a printed tape 15 which also may be found on conventional adding machines. Additionally a piezo-electric speaker 16 and a keyboard 18 which includes the semi-automatic number verification key, SNV 19 are provided in the described embodiment to facilitate semi-automatic number verification in accordance with the invention.

In addition to the SNV key 19 provided for the purposes of the described embodiment, the keyboard 18 of the apparatus 10 included many keys found on conventional adding machines. The paperload key 20 is provided for loading the paper printer tape 15 into the printer 14 by advancing the paper feed mechanism by several lines. The paper advance feed key 22 advances the paper by one line without printing anything or effecting the calculation. The clear key 24 clears the display, the independent add register and any pending operations and any error or overflow condition. The change sign key 26 changes the sign (plus or minus) of the displayed number. The percent key 28 instructs the calculator of apparatus 10 to interpret the number of the display as a percentage and completes a multiplication or division operation. For division, the result is automatically multiplied by one hundred. The clear entry key 30 clears an entry, enabling the operator to enter another number in its place while not clearing the independent add register or any pending operation. The non-add key 32 prints a reference number without affecting calculations in progress. The number is printed at the left of the paper printed tape 15. The operator can enter decimal points within the number to separate parts of the number. The right shift key 34 removes the last digit entered in the display and shifts the remaining digits one space to the right, which enables the operator to make corrections without clearing the entire entry. The divide key 36 instructs the calculator to divide the number in the display by the next value entered. The equal key 38 completes any pending multiplication or division operation but does not add the result to the independent add register. The multiply key 40 instructs the calculator to multiply the number in the display 12 by the next value entered.

A numeric keypad 42 includes number keys, 0–9 and 00, for entering numbers to the display 12, and also includes a decimal point key 43 for entering a decimal point where typically in the absence of a decimal point, the calculator automatically places the decimal point to the right of an entered number in floating and fixed decimal modes as shown on the display 12. Item key 44 is provided to display the current item count of the series of numbers entered. Gross margin key 46 calculates the selling price of an item when its cost and gross profit (or loss) margin are known. Minus equals key 48 subtracts a number from the independent add register, and a plus equals key 50 adds a number to the independent add register. Percent change key 52 computes the percentage change between two values. A grand total key 54 displays and prints the grand total of all calculation totals previously performed in the independent add register and also clears the grand total register if enabled. A subtotal key 56 displays and prints the subtotal in the independent add register but does not effect the contents thereof.

A total key 58 displays and prints the total in the independent add register, then clears the register. As discussed further below, the total key 58 is used in connection with the SNV function to demark the end of the entry of the first series and begin the entry of the second series and printing of the numbers. As provided on many conventional calculators, the apparatus 10 includes various memory functions including a memory total key 60, a memory subtotal key 62, a subtract from memory key 64 and an add to memory key 66.

Figure 2:
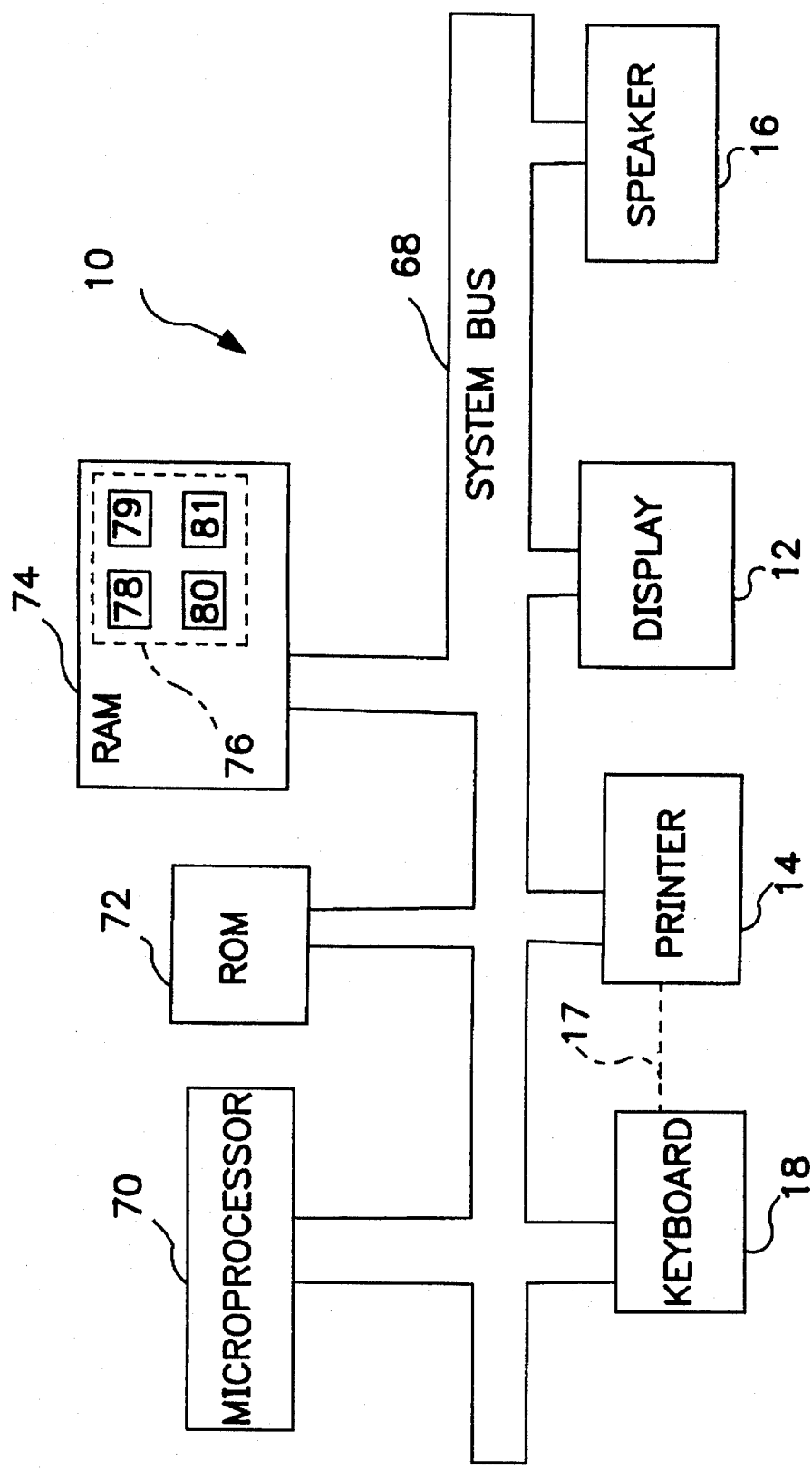
FIG. 2 is an overview block diagram of the apparatus 10 showing functional blocks of the embodiment.

Referring now to the functional block diagram of FIG. 2, the apparatus 10 utilizes a system bus 68 for the interconnection of the various functional blocks of the electronic adding machine of the embodiment. The display 12, printer 14, speaker 16 and keyboard 18, discussed above, are interconnected via the system bus 68 including associated interface circuitry and software drivers to facilitate the interface. In addition to the printer bus interface, a link 17 is provided between the keyboard 18 and printer 14 to facilitate the disabling of the printer as desired in carrying out the SNV function.

A microprocessor 70 is connected to the bus 68 for controlling the operation of the apparatus 10. A ROM 72 and RAM 74 are also connected to the system bus 68 providing programming and data storage for the microprocessor 70. Additionally, the RAM 74 includes a RAM module 76 in which a first series array 78, a second series array 79, a first counter 80 and a second counter 81 are provided for carrying out the SNV function, the microprocessor 70 facilitating keypunching of data via the keyboard 18 for entry into the first and second series arrays 78 and 79.

FIG. 3 illustrates the program flow of the apparatus 10 and particularly that of the SNV process, which begins at START SNV 100, when the keypunch operator depresses the SNV 19 button of keyboard 18 to start the process. A decimal number is entered by the operator on the numeric keypad 42 of the keyboard 18 which will appear on the display 12 and independent add register of the microprocessor 70. An associated computation operator is entered at 104, i.e., minus-equals key 48, plus-equals key 50 or total key 58. At 106 the added or subtracted number is provided to the first running total in the first series array 78 of the RAM module 76 and thus the first counter 80 is incremented by one at 108. Decision block 110 determines whether the associated computation operator was a plus or minus, or whether the operator was the total. If a plus or minus operator was entered, program flow returns to go to the next number at 112 and the entry of the first series of numbers continues as described. If the total key 58 was entered, add-on capabilities may be facilitated in the apparatus 10 at block 114 including, but not limited to storing running totals, comparing running subtotals, modifying running subtotals and displaying additional numbers, e.g., the running total and/or subtotals.

Entry of the second series of numbers, i.e., re-entering original numbers in the same predetermined order, begins at 116 wherein the numbers are entered again by the operator via the keyboard 18. A pending operation is entered at 118, and the number entered is added or subtracted from the second running total in the second series array 79 at 120. The second counter 81 is then incremented for the second running total at 122. Compare block 124 compares the second running total to the first running total, i.e., first series array 78 and second series array 79, and also compares the second entry count with the first entry count, i.e., first counter 80 and second counter 81. A decision block 126 determines whether the values compared at compare block 124 are the same. If the numbers compared at compare block 124 are not the same, an alarm is provided at block 128 providing a sound alarm via speaker 16 and flashing of the display 12. Block 130 thus resets second counter and second running total to previous values so the entry may be compared with an original document and that of the first and second entries for determination of the correct entry and subsequent re-entry.

Comparison of the individual entries in the first running total in memory and the second running total in memory, following block, 130 starts at block 140 where the second entry is compared to the original on the source document. Decision block 142 provides a determination of whether the second entry and the original are the same value. If from block 142 it is determined that the values are the same, i.e., are the values the same?=YES, then the arithmetic operator is re-entered thus modifying the first running counter and total at block 144; whereupon the discrepancy thus corrected and the printer 16 reactivated allows the verified correct entry to be printed out by the printer 16 at block 132. If the entries are determined to be different, i.e., are the values the same?=NO, then block 146 facilitates the correct second entry by modifying the second running counter and total. Block 148 compares the second running total to the first running total; compare second counter to first counter. Then at decision block 126, entries are again compared to determine whether the first and second running totals and counters are the same. From block 126, as described, block 128 indicates differing values while program flow continues through block 132 when the values are the same. Again, entry of the series of numbers in the predetermined order after the block 134 and the block 138 going on to the next number, resumes at block 116 where the numbers are entered again by the operator via the keyboard 18, as described above.

When the values compared to compare block 124 are determined to be the same at decision block 126, program flow proceeds to block 134 where the entered number may be printed on the printer 14 if the printer is turned on and a printed tape 15 is desired by the keypunch operator. Decision block 134, as decision block 110, determines whether the operator was a plus or minus, or a total, the total indicating the end of the data entry at block 136. If the series was not to be totalled yet, i.e., the operator was a plus or minus, program flow proceeds to block 138 allowing the apparatus 10 to receive the next number from the operator at block 116. When the subsequent entries are correctly entered, the pending operation may simply be re-entered at block 118 to insert the verified correct keypunch entry replacing any identified entry which was erroneous as described.

Accordingly, the resulting second entry of a series of numbers entered in accordance with the SNV process described above, provides a verified total and optionally an error-free printed tape 15 thus providing a corrected total the second time, every time a series of numbers is entered and verified utilizing SNV. The immediate identification of keypunch errors as they may occur is presented to alert the operator of the potential for such errors facilitation the verification and correction of erroneous keypunch entries before they become manifested and not readily identifiable within the lengthy series of computations. The described SNV process utilizes the first and second series arrays and first and second counters provided in the RAM module 76 for facilitating the industry standard double-checking of the series of numbers utilizing the apparatus 10 to facilitate comparison between the series arrays and counters notifying the operator of the apparent entry errors.

While a preferred embodiment of the invention has been shown and described for the method and apparatus for semi-automatic number verification (SNV), other embodiments of the present invention will be readily apparent to those skilled in the art from consideration of the specification and practice of the invention disclosed herein. It is intended therefore that the embodiment of the present invention described herein be considered as exemplary only, with a true scope and spirit of the invention being indicated by the following claims.

What is claimed is:

1. An apparatus for semi-automatic number verification comprising:

a microprocessor;

a RAM module comprising first and second series arrays and first and second counters;

an electronic display; and a keyboard connected to said microprocessor, RAM module and electronic display for entry of a first series of numbers and associated computational operations in a predetermined order, storing results of computational operations as a first running total in said first series array; and said keyboard comprising means for repeating the keypunch entry of each number of said first series of numbers and said associated computational operations as a second running total, storing said second running total in said second series array as the series of numbers is entered to compare said second running total with said first running total for the identification of any discrepancies between the first and second series arrays and first and second counters of said RAM module.

2. An apparatus in accordance with claim 1 wherein said keyboard comprises an operational mode switch for switching between a first mode of operation for receiving the series of numeric computations of the first running total of said first series array and a second mode of operation for receiving the series of numeric computations of the second running total of said second series array.

3. An apparatus in accordance with claim 2 comprising a printer for printing said series of numeric computations of the second running total of said second series array while in said second mode of operation.

4. An apparatus in accordance with claim 3 comprising a speaker for audibly alarming of any discrepancies between said second running total and said first running total.

5. An apparatus in accordance with claim 4 wherein said electronic display provides visual indication of any of said discrepancies by flashing said display and indicating the numeric entry for verification and correction thereof.

6. A method of semi-automatic number verification with an electronic adding machine comprising the steps of:

providing a first mode of operation of the adding machine for maintaining a running total of computations entered thereby;

providing a second mode of operation of the adding machine for comparison with said running total of computations of said first mode of operation;

while in said first mode of operation, receiving a first series of numeric computations in a predetermined order for temporary storage thereof;

while in said second mode of operation, receiving a second series of numeric computations in said predetermined order for comparison with said temporary storage of said first series of numeric computations; and indicating any discrepancies between said first series of numeric computations and said second series of numeric computations as said discrepancies occur.

7. A method in accordance with claim 6 comprising the step of manually switching the electronic adding machine from said first mode of operation to said second mode of operation to perform the semi-automatic number verification.

8. A method in accordance with claim 7 comprising the step of correcting any of said discrepancies indicated by said indicating step comprising the step of identifying entries of said first and second series of numbers for verification and entry of the correct number in the numeric computation in said second mode of operation.

9. A method in accordance with claim 8 comprising the step of counting said first series of numeric computations and counting said second series of numeric computations as indicative of discrepancies between said series of numeric computations for use by said indicating step.

10. A method in accordance with claim 9 comprising the step of printing said second series of numeric computations in said predetermined order.

11. A method in accordance with claim 10 wherein said indicating step comprises of the step of providing an audible or visual alarm indicating said discrepancies indicated in said indicating step.

12. A method of semi-automatic number verification in the computation of a series of numbers entered by a keypunch operator, the method comprising the steps of:

keypunching the entry of the entire series of numbers and a series of associated computational operations in a predetermined order;

storing a first running total in a first series array as the series of numbers is entered in said keypunching step;

repeating the keypunch entry of each number of said series of numbers and said series of associated computational operations;

storing a second running total in a second series array as the series of numbers is entered in said repeating step;

comparing said second running total with said first running total; and alarming the keypunch operator of any discrepancies between said second running total and said first running total in said comparing step.

13. A method in accordance with claim 12 further comprising the step of correcting any of said discrepancies from said comparing step.

14. A method in accordance with claim 13 wherein said correcting step comprises the step of identifying the keypunch entries of said first series array and said second series array of respective first and second series of numbers for verification and wherein said correcting step comprises entry of a verified correct number for the storing of said second running total in said second series array as the series of numbers is entered in said repeating step.

15. A method in accordance with claim 14 wherein entry of the correct number as the entry stored in said repeating step is accomplished by the second entry of the associated pending computational operation.

16. A method in accordance with claim 15 comprising the steps of:

counting each entry of said first series array of numbers in a first running counter;

counting each entry of said second series array of numbers of said repeating step in a second running counter;

comparing said second running counter with said first running counter; and wherein said alarming step further comprises alarming the keypunch operator of any discrepancies in said first and second running counters.

17. A method in accordance with claim 16 wherein said alarming step comprises the step of audibly alarming the keypunch operator with an audible beep sound signifying the discrepancy between the entry of said series of numbers.

18. A method in accordance with claim 17 comprising the step of printing the keypunch entry of each number of said series of numbers during said repeating step.

19. A method in accordance with claim 18 wherein said alarming step comprises the step of visually alarming the keypunch operator of the discrepancy by visually flashing the keypunch entry of said repeating step on an electronic display.

20. A method in accordance with claim 19 comprising the step of selectively enabling and disabling printing of the entry of the entire series of numbers during the storing of said first running total in said first series array as said series of numbers is entered in said keypunching step.

* * * * *